Aug. 10, 1943.   J. CRAPEZ   2,326,124
PSYCHROMETER
Filed July 7, 1939
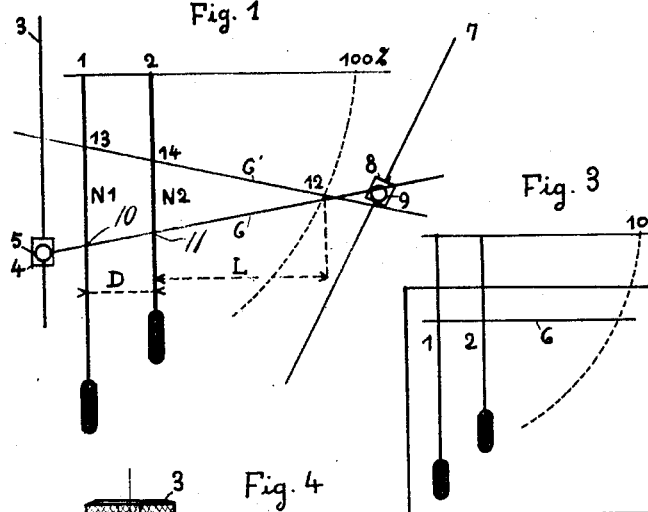
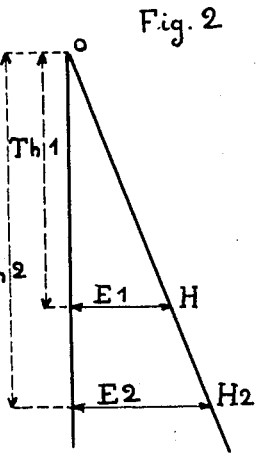
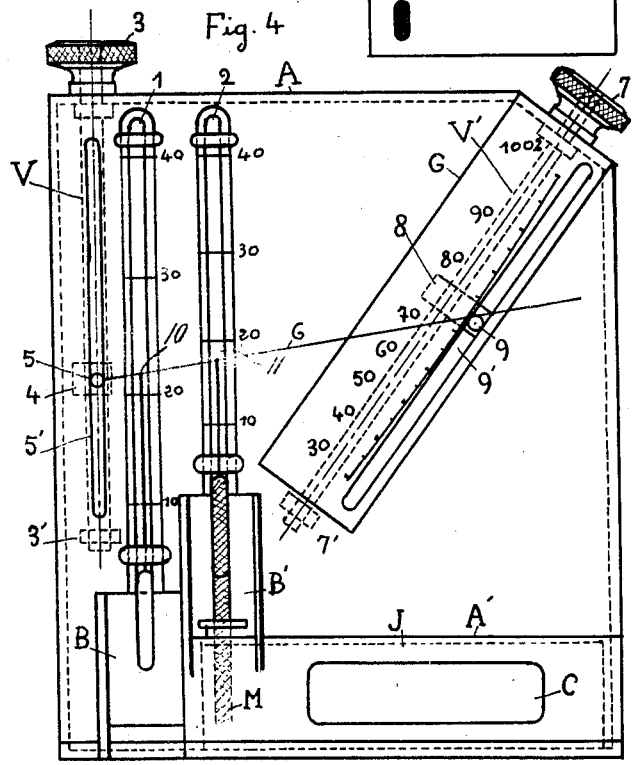
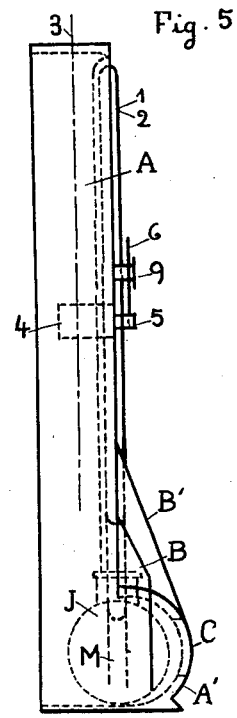
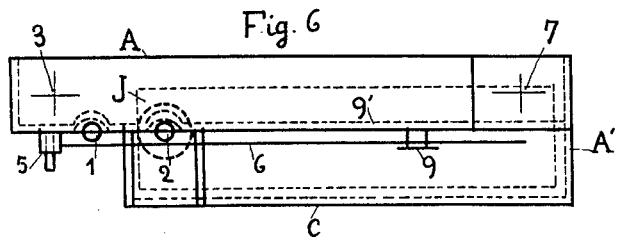
INVENTOR
JULES CRAPEZ
BY
Richards Geier
ATTORNEYS

UNITED STATES PATENT OFFICE 2,326,124

PSYCHROMETER

Jules Crapez, Mons-en-Baroeul, France; vested in the Alien Property Custodian

Application July 7, 1939, Serial No. 283,196
In France July 16, 1938

4 Claims. (Cl. 73—338)

This invention relates to an improved psychrometer, and the object of the invention is to provide a direct reading psychrometer in which readings can be taken immediately so as to obtain the hygrometric degree of any atmosphere without having to read, or know the readings of a dry bulb thermometer and a wet bulb thermometer, and without having to make any calculation.

This object is completely attained by the psychrometric device described below, which comprises a special arrangement of a dry bulb thermometer and a wet bulb thermometer, with a mechanical means for actuating a rectilinear rod which can be aligned with the meniscuses formed by the two levels of the thermometer columns so as to indicate on a scale graduated for this purpose the corresponding hygrometric degree.

In addition, this device has the advantage that it can be made specially suitable for a given range of hygrometer readings by varying the respective positions of the thermometer scales of the dry bulb and wet bulb thermometers, both by the relative dimensions of their graduations and by the distance separating the two thermometers.

Figures 1 to 6 of the accompanying drawing show by way of example one embodiment of the invention and the manner of carrying it out in practice.

Figures 1 to 3 explain technically the conditions required for constructing one of these types of psychrometer.

Figures 4 to 6 show an elevation, profile and plan view respectively of apparatus constructed for industrial requirements.

Referring to said drawing, Figure 1 shows two thermometers 1 and 2 placed at a certain distance D from one another.

The length of the scale of the thermometer 2 is less than the length of the scale of the thermometer 1. The bulb of thermometer 2 which is the wet bulb thermometer is maintained permanently moist. The highest graduations of each of the two thermometers which here are assumed to have the same thermometric value, are placed at the same level.

A screw 3 actuating a nut 4 provided with a projection 5 supports a rod 6 which can turn freely on said projection.

Another screw 7 actuates a nut 8 which likewise carries a projection such as 9, on which rests the other end of the rod 6 which may or may not be supported in a catch.

The rod 6 moves in front of a scale graduated according to a table of hygrometric degrees for psychrometer reading. If by operating the screws 3 and 7 the rod 6 is aligned with the tops 10 and 11 of the meniscuses of the dry bulb and wet bulb thermometer columns, this rod likewise passes through the point 12 of the scale representing the hygrometric degree sought.

In effect, suppose that the previous position corresponds to a given hygrometric degree. Now suppose rod 6 to be moved to a second position 6', with positions 13 and 14 of the meniscuses corresponding to the same hygrometric degree represented by the point 12. If $N_1$ is the number of degrees between the two positions 10 and 13, and $N_2$ the number of degrees between the positions 11 and 14, and if on the other hand L is the distance from the point 12 to the thermometer 2, we have:

$$\frac{N_1}{N_2}=\frac{L+D}{L} \qquad (1)$$

Now, if the tables for determining the hygrometric degree are considered these tables being prepared on the basis of the number of degrees of the wet bulb thermometer plotted as ordinates and the difference between the degrees shown on the dry bulb thermometer and the wet bulb thermometer plotted as abscissae, it is noticed that all the values of the same hygrometric degree are aligned. Let us assume, therefore, one of these tables and the indication of the values corresponding to 11 and 14 previously taken as an example for the wet bulb thermometer. The values of the hygrometric degree H and $H_1$ represented by the point 12 on the scale of the apparatus are aligned and cut at 0 the axis showing the readings of the wet bulb thermometer (see Figure 2). If $Th1$ and $Th2$ represent the numbers of absolute degrees between the point of intersection 0 and the point representing the wet bulb temperatures, and if $E1$ and $E2$ are the differences between the wet bulb thermometer $Th$ and the dry bulb thermometer $Ts$, according to these tables and for the same hygrometric degree we can write:

$$\frac{E1}{Th1}=\frac{E2}{Th2}$$

or $$\frac{E1+Th1}{Th1}=\frac{E2+Th2}{Th2}=\frac{Ts1}{Th1}=\frac{Ts2}{Th2}=\frac{Ts1-Ts2}{Th1-Th2}=\frac{N1}{N2}$$

For the same hygrometric degree the ratio $$\frac{N1}{N2}$$

is therefore constant and equal to the general ratio $$\frac{Ts}{Th}$$

deducted from the tables of readings.

The same illustration could be repeated for other values of hygrometric degrees. If the rod 6 passing through 10 does not pass through 11 it will then intersect the scale of the hygrometric degrees at another point.

Consequently, for a given hygrometric degree the point 12 is defined by the relation (1)

$$\frac{N1}{N2} = \frac{L+D}{L} = 1 + \frac{D}{L}$$

For any value of $$\frac{N1}{N2} = \frac{Ts}{Th}$$

therefore there is a single value of L.

In order to be able to integrate the scale bearing the indications of the different values of the hygrometric degree within given limits, the value of the graduations of the wet bulb thermometer are reduced in the ratio K, this ratio being greater than unity.

This fact does not alter the equality of the previous ratios which become:

$$\frac{Ts1}{\frac{Th1}{K}} = \frac{Ts2}{\frac{Th2}{K}} = \frac{N1}{\frac{N2}{K}}$$

By reducing $Th$, $N2$ is reduced in the same ratio.

On the other hand Equation 1 can be written:

$$L = \frac{DN2}{N1 - N2}$$

If $N2$ is reduced in the ratio K we shall have:

$$L = \frac{\frac{DN2}{K}}{N1 - \frac{N2}{K}} = \frac{DN2}{KN1 - N2}$$

As K is greater than 1, it is clear that by reducing N2, L will be reduced.

It has been stated that this psychrometer can be used for taking readings with increased accuracy in some particular region of the scale of hygrometric degrees.

In effect, if at the maximum dry temperature for which the dry bulb thermometer has been designed there is aligned horizontally with this dry division the maximum graduation of a wet bulb thermometer lower than the temperature of the dry bulb thermometer, it follows that on this horizontal line there will be aligned a point of the scale of hygrometric degrees indicating a value below the saturation point, since for this value aligned on the horizontal there is a difference between the readings of the dry bulb and wet bulb thermometers.

This value of the hygrometric degree corresponds at this moment to given indications obtained by a substantially horizontal position of the rod 6 (see Figure 3) which corresponds to the maximum accuracy of reading with a size of thermometer for the range of readings to be effected.

This modified apparatus corresponds in fact to a much larger psychrometer.

An example of an apparatus constructed according to these data is shown in Figures 4 to 6, from which it will be seen that the psychrometer comprises a frame A forming a casing with enlargement A' for accommodating the water tank, apertures B and B' for allowing access of air to the thermometers and apertures C for looking at the level of the water in the tank. This frame receives in suitable recesses thermometers 1 and 2, namely the dry bulb thermometer and the wet thermometer, the bulb of the latter being provided with a piece of muslin M dipping into a container such as J which is suitably maintained in place while being capable of easy removal for refilling it with distilled water.

As can be ascertained, the thermometers 1 and 2 have different lengths of graduations, but in this particular construction the highest graduations are placed at the same level. The frame A in the form of a casing encloses screws V and V' having milled operating knobs 3 and 7. The screw V guided at 3' at its lower part carries a nut 4 provided with a projection 5 which moves in a slot 5'. The screw V' guided in the same way at 7' and carrying a milled operating knob 7 passes through a nut 8 carrying a projection 9 which slides in the slot 9' at a certain inclination on the board G which is graduated in hygrometric degrees according to a table in use with ordinary psychrometers. The two movable projections 5 and 9 serving for the displacement of a rod 6 must be aligned on the meniscuses formed by the two levels of thermometers 1 and 2. For this purpose one of its ends is pivotally mounted on the projection 5, and the other free end rests on the projection 9 and is guided or retained in a small catch (not shown in the drawing).

It will be understood that under these conditions it will be sufficient to actuate the two milled knobs 3 and 7 in order to bring 6 to the level of the two thermometer columns and to read on the scale G the hygrometric degree corresponding to these two levels.

As can be understood this apparatus is very simple, its mechanism cannot get out of order and on account of the arrangement of the two thermometers which could be varied as stated it becomes possible to specify certain types of apparatus for different well defined ranges of readings, said types of apparatus being consequently suitable for the requirements of some industry or other.

I claim:

1. A direct reading psychrometer comprising in combination a support, a dry bulb thermometer and a wet bulb thermometer both of the mercury type spaced parallel to each other and mounted on said support, a hygrometer scale on said support and extending at an acute angle to said thermometers, a rod or equivalent member extending across said two thermometers and said scale, and means for aligning said rod or equivalent member with the meniscuses of the thermometer columns the hygrometer scale being so related to the rectilinear rod when in registry with the meniscuses of the indicating columns of the thermometers that the rod intersects the scale to give a correct reading of the hygrometric state of the atmosphere being measured.

2. A direct reading psychrometer comprising in combination a support, a dry bulb thermometer and a wet bulb thermometer both of the mercury type spaced parallel to each other and mounted on said support, a hygrometer scale on said support, a rod or equivalent member, movable members supporting said rod or equivalent member, a vertical guide and an obliquely inclined guide for said movable members, and screw means for adjusting said rod or equivalent member to align it with the tops of the thermometer columns, the hygrometer scale being so related to the rectilinear rod when in registry with the meniscuses of the indicating columns of the thermometers that the rod intersects the scale to give a correct reading of the hygrometric state of the atmosphere being measured.

3. A direct reading psychrometer comprising in combination a support, a dry bulb thermometer and a wet bulb thermometer both of the mercury type spaced parallel to each other and mounted on said support, a hygrometer scale on said support, a rod or equivalent member, two sliders, on one of which said rod or equivalent member is pivotally mounted while the other acts as a rest, a vertical guide and an obliquely inclined guide for said two sliders, and separate screw means for adjusting the positions of said two sliders to align said rod or equivalent member with the tops of the thermometer columns, the hygrometer scale being so related to the rectilinear rod when in registry with the meniscuses of the indicating columns of the thermometers that the rod intersects the scale to give a correct reading of the hygrometric state of the atmosphere being measured.

4. A direct reading psychrometer comprising in combination a support, a dry bulb thermometer mounted on said support, a wet bulb thermometer also mounted on said support parallel to the dry bulb thermometer and graduated in shorter lengths per degree than said dry bulb thermometer, both thermometers being of the mercury type, a hygrometer scale mounted on said support, a slot adjacent said dry bulb thermometer and a second slot extending at an acute angle to the first slot and situated adjacent said hygrometer scale, sliders movable in said slots, a rod pivotally mounted on one of said sliders and freely supported by the other slider, and separate screw means for raising and lowering said sliders independently, the hygrometer scale being so related to the rectilinear rod when in registry with the meniscuses of the indicating columns of the thermometers that the rod intersects the scale to give a correct reading of the hygrometric state of the atmosphere being measured.

JULES CRAPEZ.